(No Model.) 14 Sheets—Sheet 1.
T. MUNNELL.
CASH INDICATOR AND REGISTER.
No. 410,603. Patented Sept. 10, 1889.
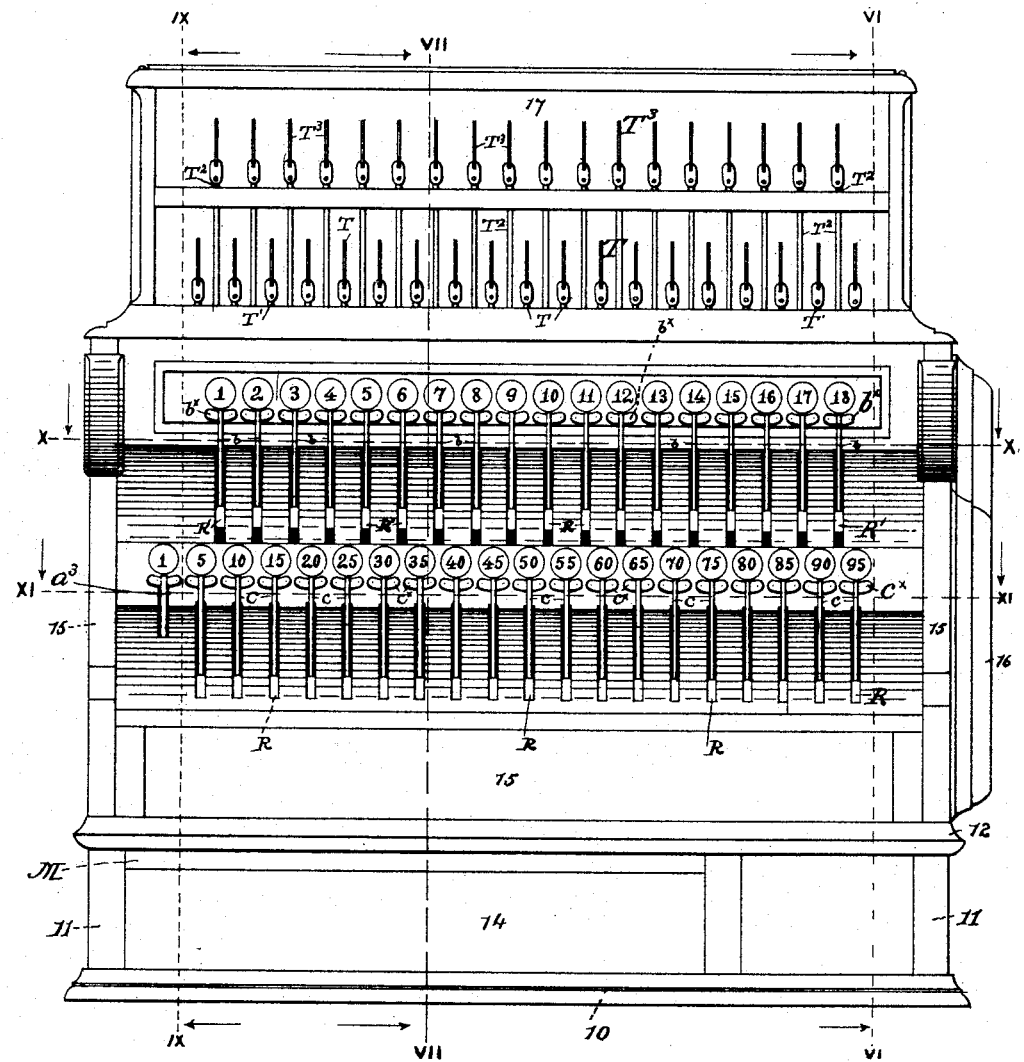
Fig. I
Witnesses:
W. C. Jirdinston.
Inventor:
Thomas Munnell
by Jeptha Garrard
his Attorney.

(No Model.) 14 Sheets—Sheet 2.
T. MUNNELL.
CASH INDICATOR AND REGISTER.
No. 410,603. Patented Sept. 10, 1889.
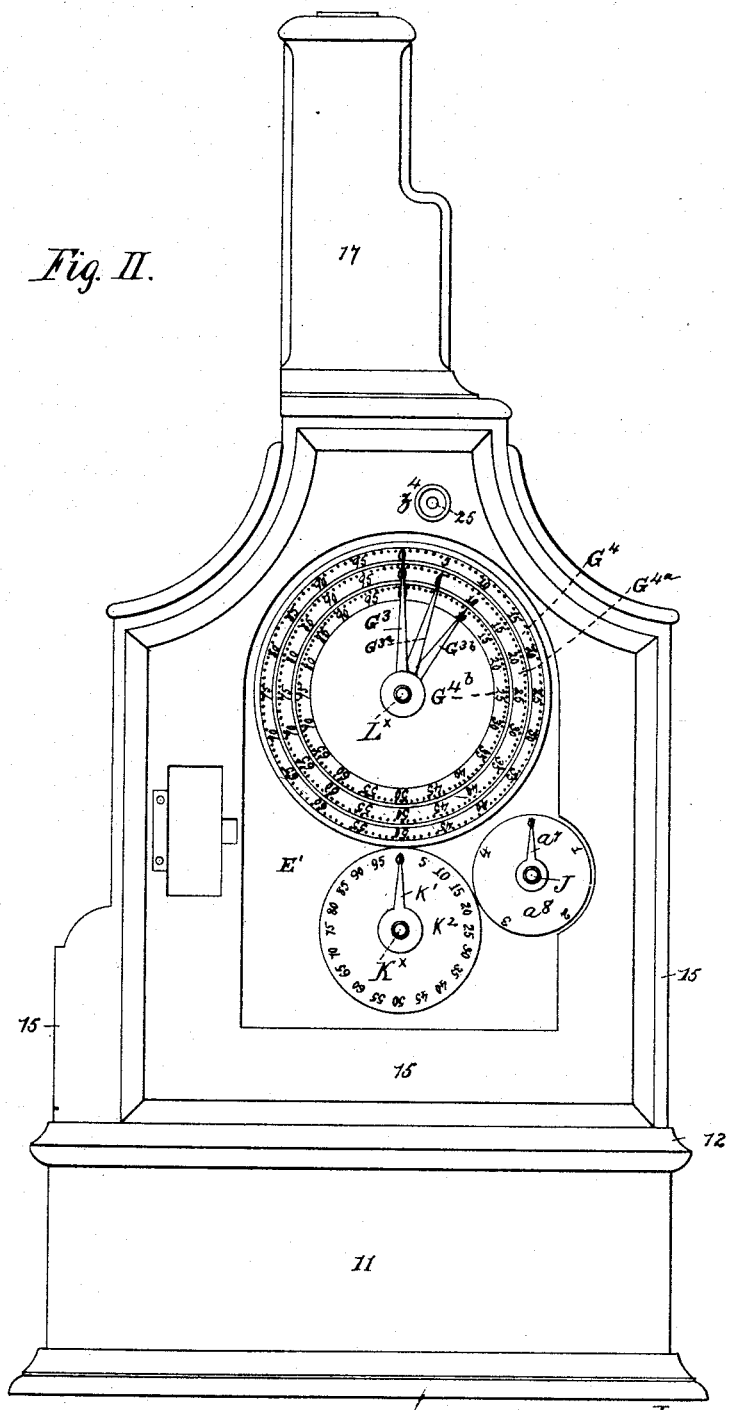
Fig. II.
Witnesses:
W. C. Jirdinston.
P. J. Cadwallader
Inventor:
Thomas Munnell
by Jeptha Garrard
his Attorney.

(No Model.) 14 Sheets—Sheet 3.
T. MUNNELL.
CASH INDICATOR AND REGISTER.
No. 410,603. Patented Sept. 10, 1889.
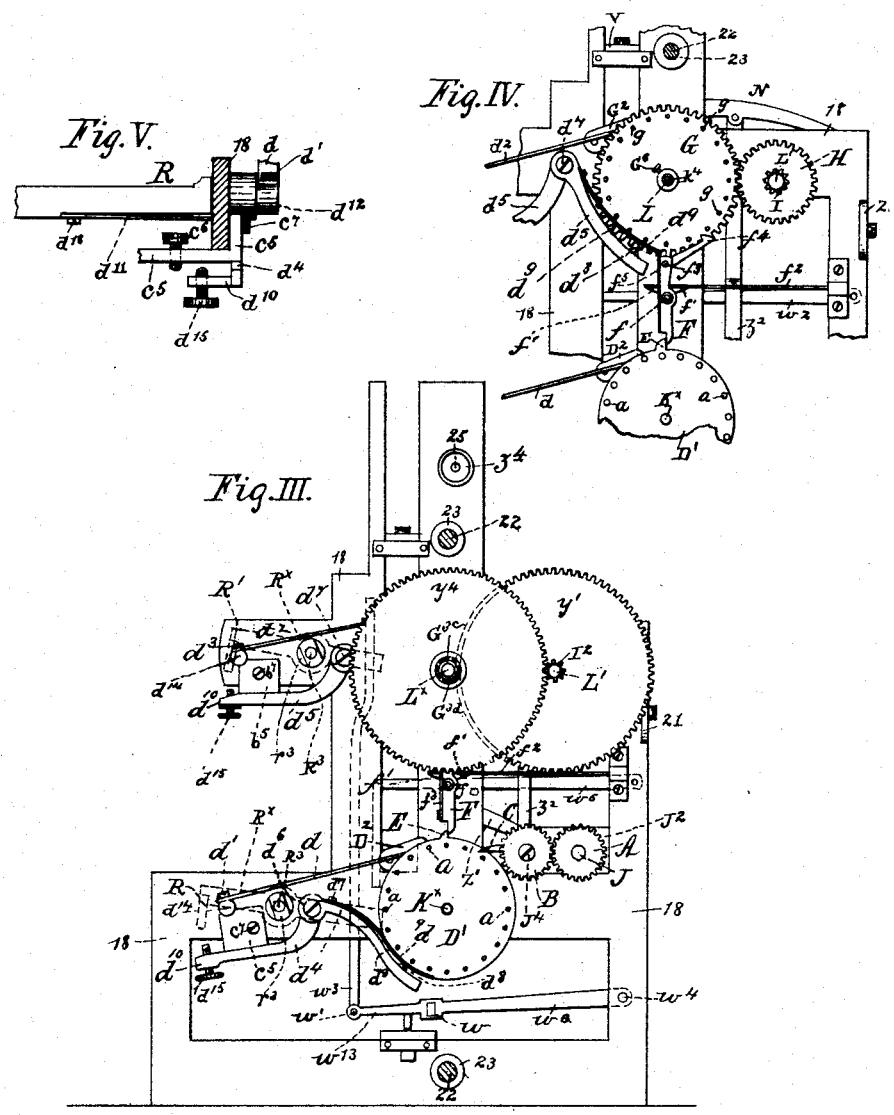
Witnesses:
W. C. Jirdinston.
Inventor:
Thomas Munnell
by Jeptha Garrard
his Attorney.

(No Model.)
14 Sheets—Sheet 4.
T. MUNNELL.
CASH INDICATOR AND REGISTER.
No. 410,603.  Patented Sept. 10, 1889.
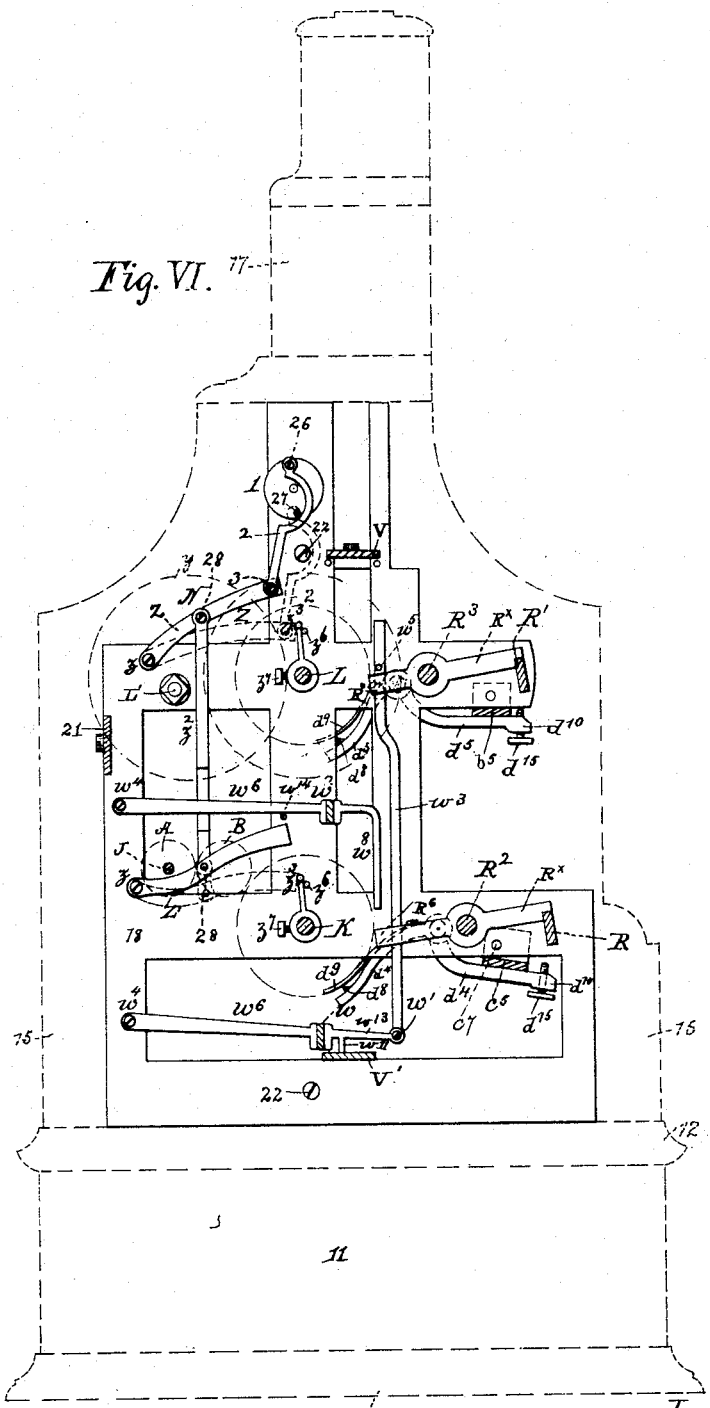
Fig. VI.
Witnesses:
W. C. Jirdinston.
Inventor:
Thomas Munnell
by Jeptha Garrard
his Attorney.

(No Model.) 14 Sheets—Sheet 5.
T. MUNNELL.
CASH INDICATOR AND REGISTER.
No. 410,603. Patented Sept. 10, 1889.
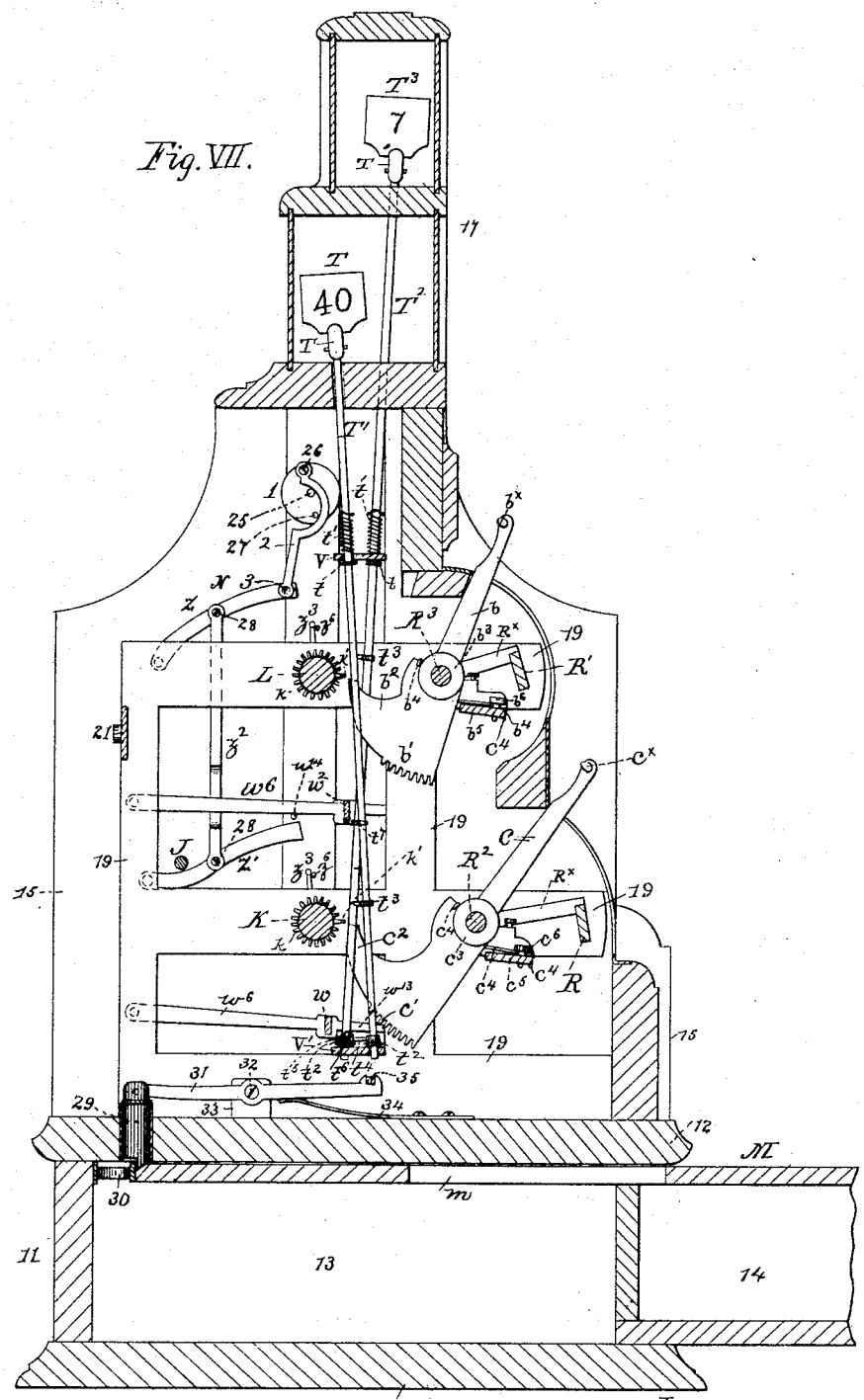
Fig. VII.
Witnesses:
W. C. Jirdinston.
R. J. Cadwallader
Inventor:
Thomas Munnell
by Jeptha Garrard
his Attorney.

(No Model.)   T. MUNNELL.   14 Sheets—Sheet 6.
CASH INDICATOR AND REGISTER.
No. 410,603.   Patented Sept. 10, 1889.
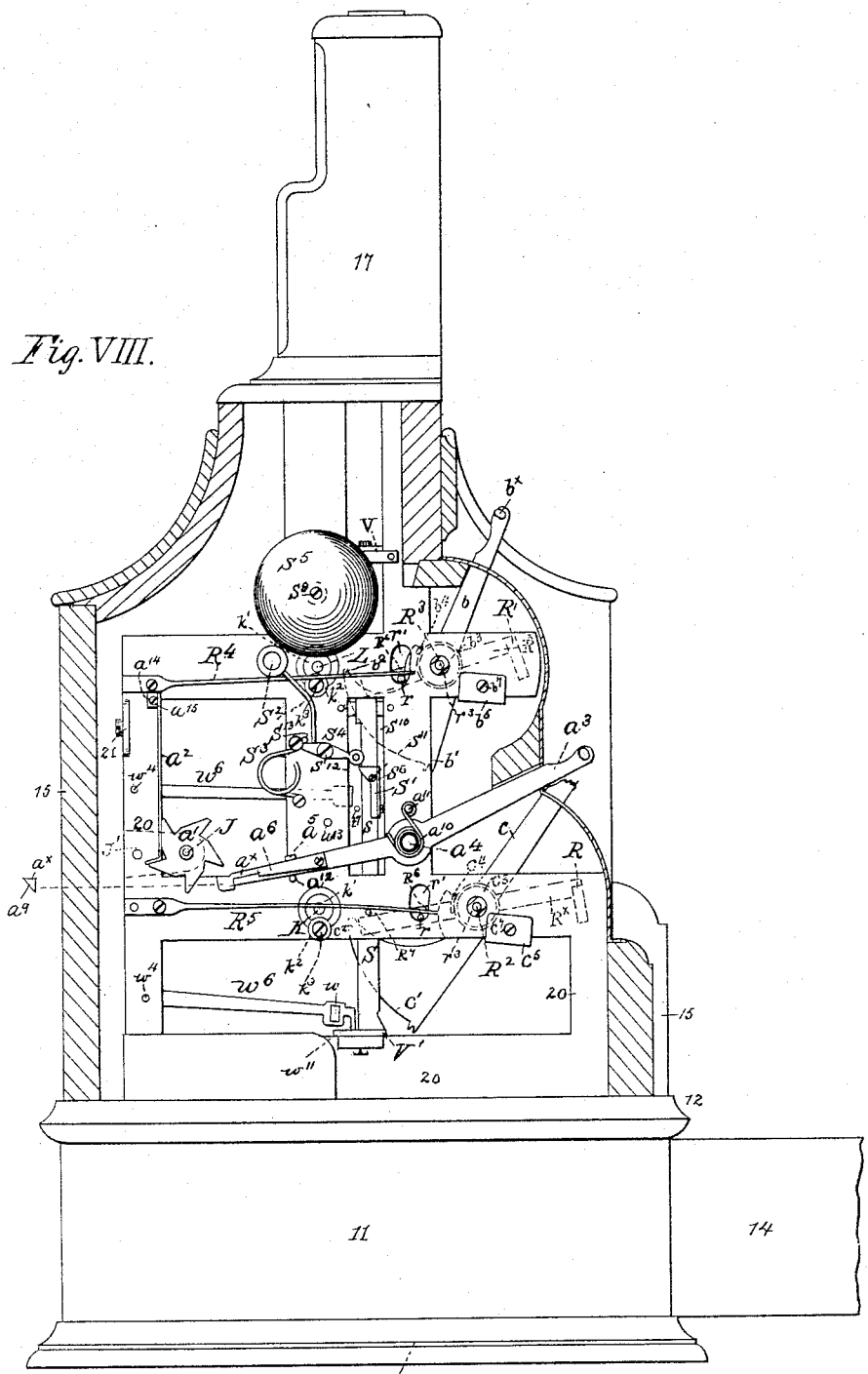
Fig. VIII.
Witnesses:
W. C. Jirdington.
J. Cadwallader
Inventor:
Thomas Munnell
by Jeptha Garrard
his Attorney.

(No Model.) 14 Sheets—Sheet 7.
T. MUNNELL.
CASH INDICATOR AND REGISTER.
No. 410,603. Patented Sept. 10, 1889.
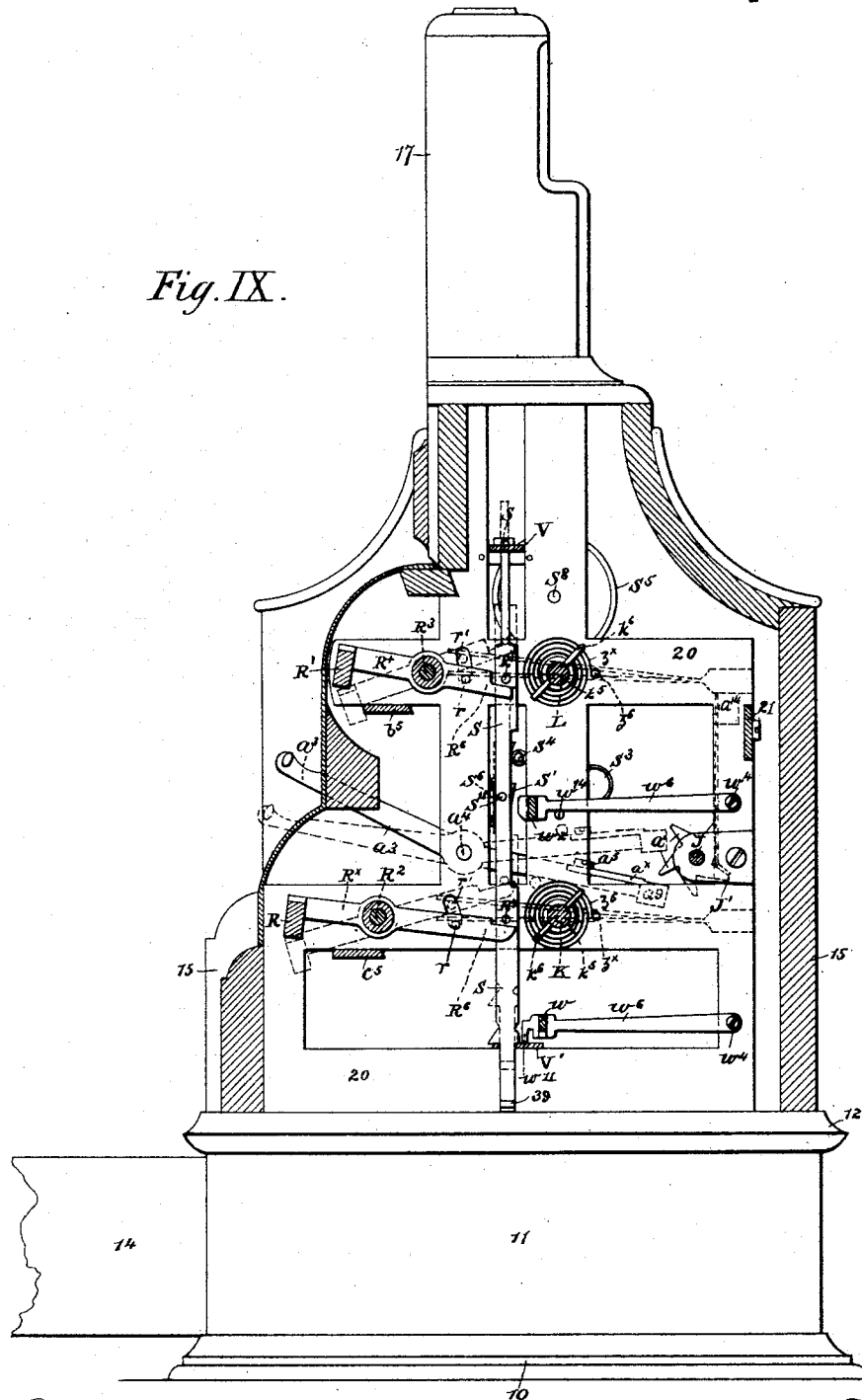
Fig. IX.

(No Model.) 14 Sheets—Sheet 8.
T. MUNNELL.
CASH INDICATOR AND REGISTER.
No. 410,603. Patented Sept. 10, 1889.
*Fig. X.*
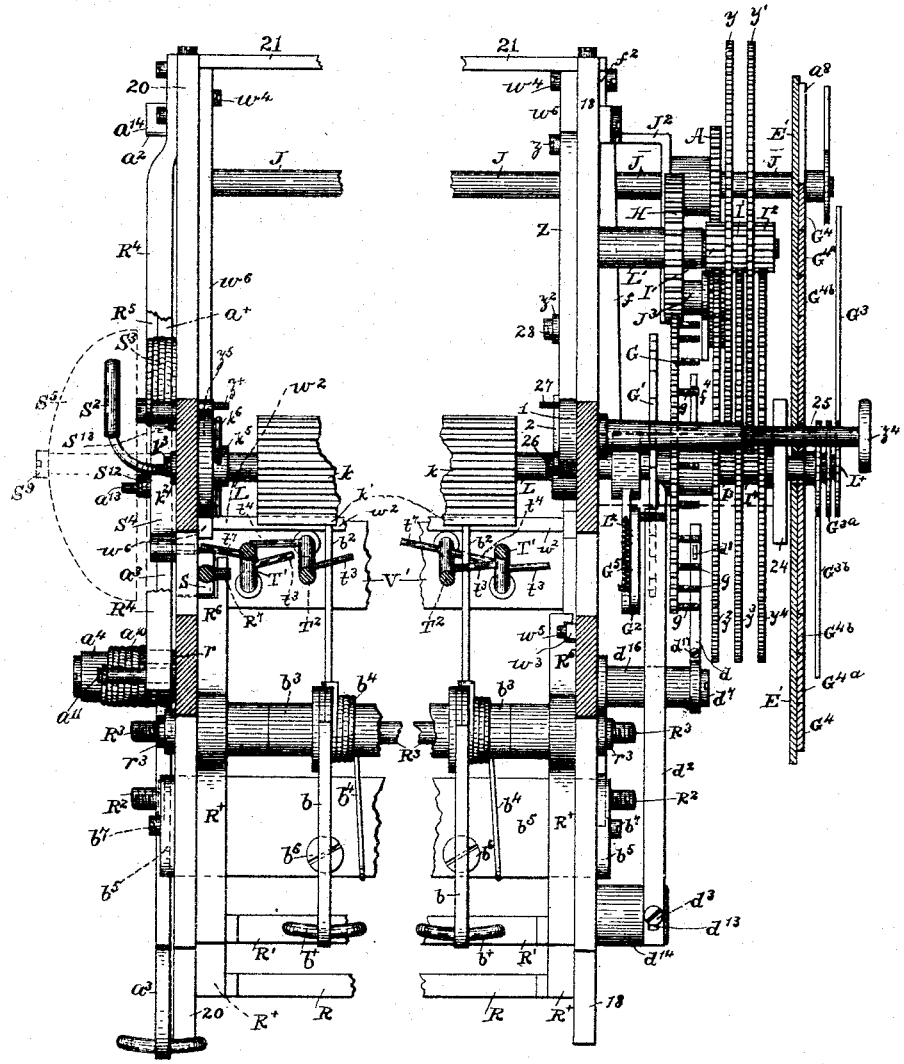
Attest:
Walter Allen
Jas. K. McCathran
Inventor:
Thomas Munnell
By Knight Bros
attys.

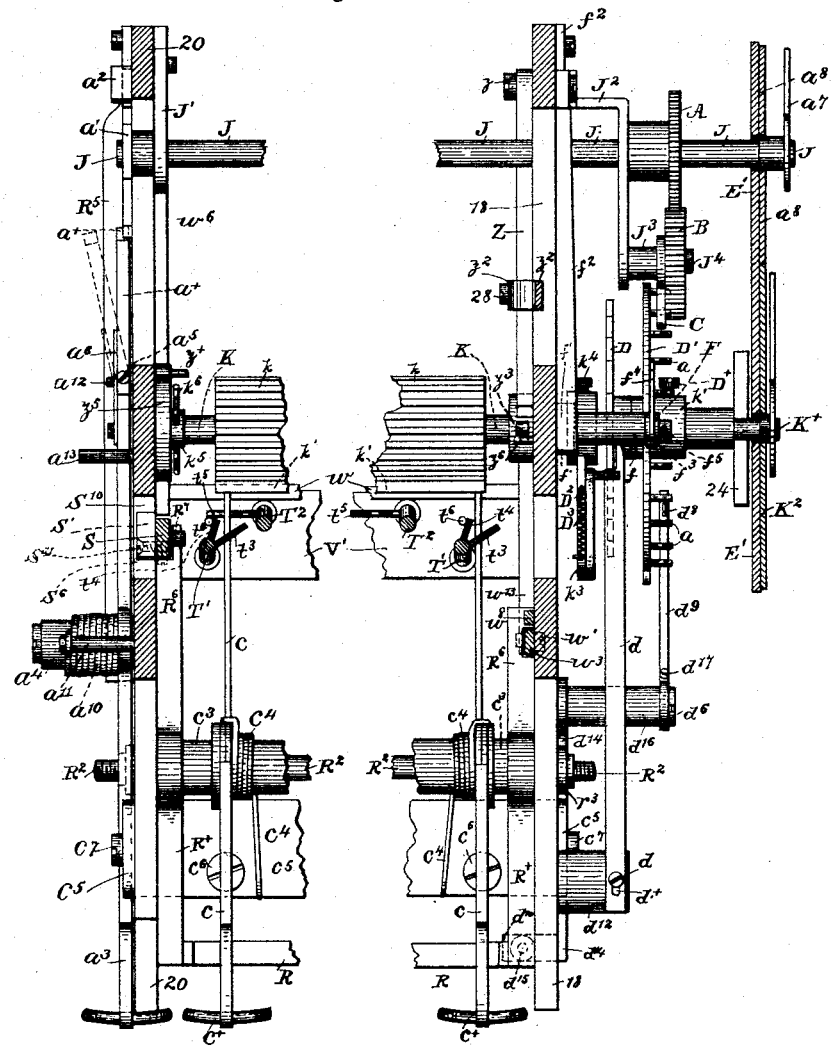

(No Model.) 14 Sheets—Sheet 10.
T. MUNNELL.
CASH INDICATOR AND REGISTER.
No. 410,603. Patented Sept. 10, 1889.
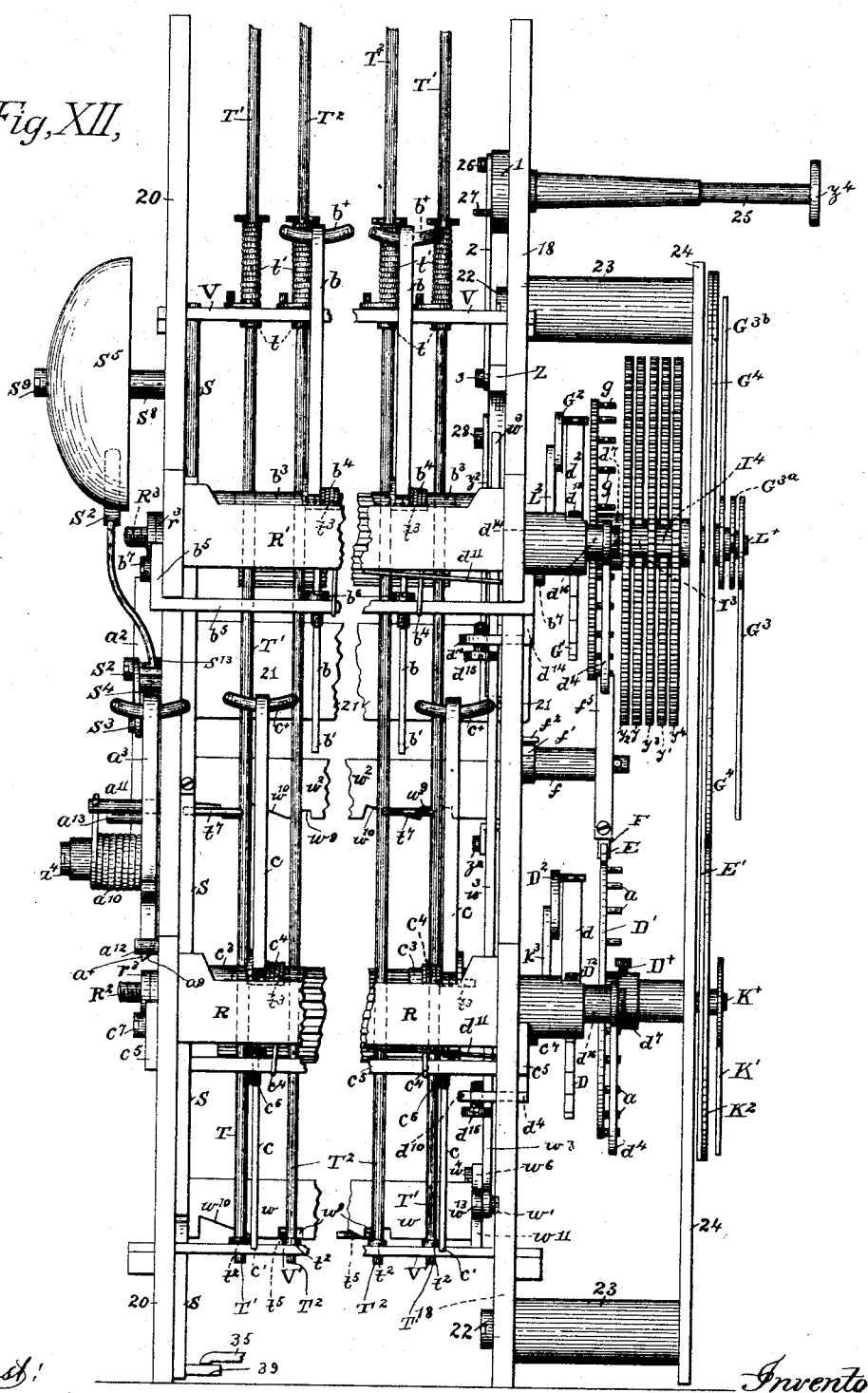
Fig. XII
Attest:
Walter Allen
Jas. L. McLathran
Inventor:
Thomas Munnell
By Knight Bros
attys.

(No Model.)  14 Sheets—Sheet 11.
T. MUNNELL.
CASH INDICATOR AND REGISTER.
No. 410,603.  Patented Sept. 10, 1889.
Fig. XIII.
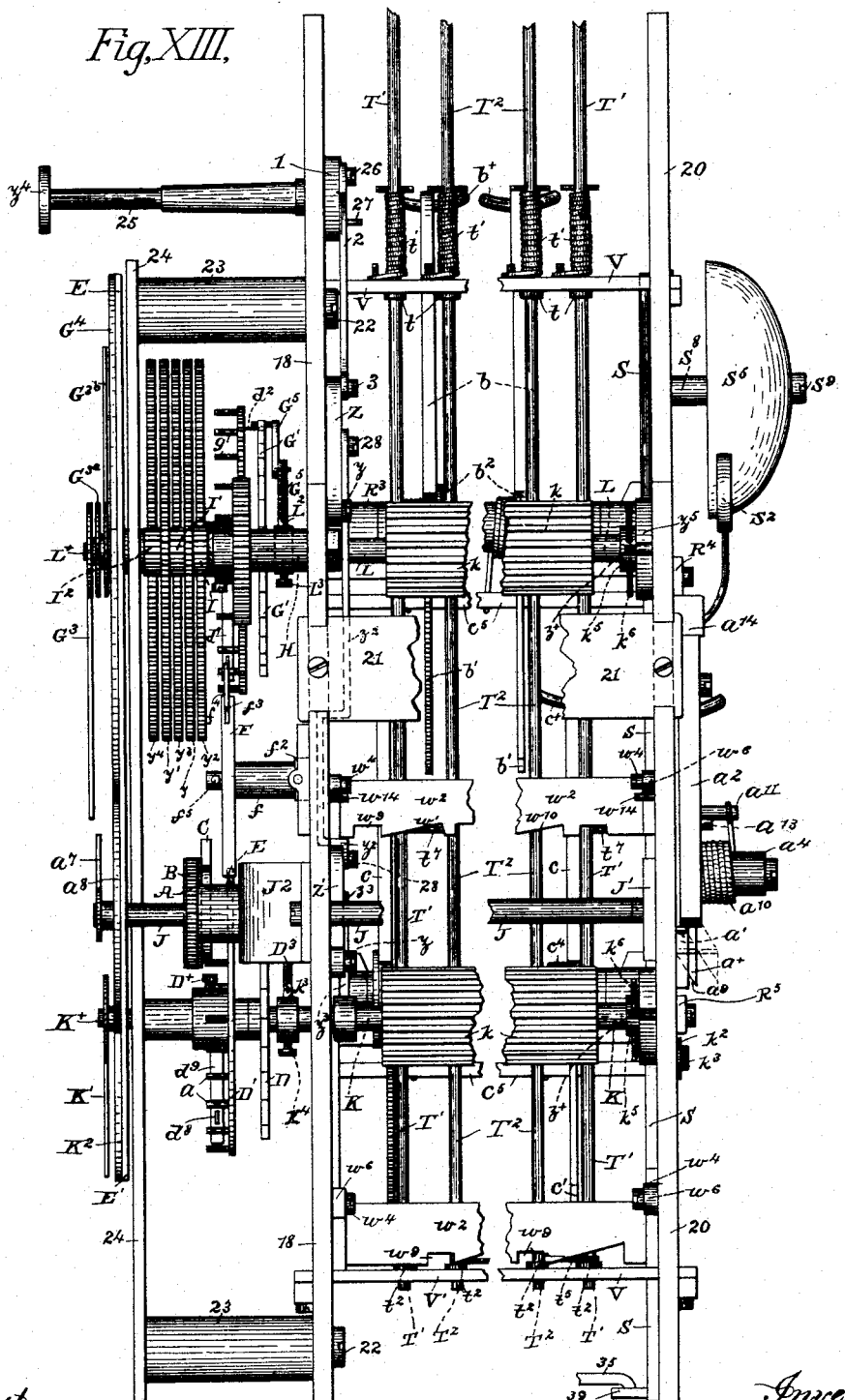
Attest  
Walter Allen  
Jas. K. McCathran
Inventor:  
Thomas Munnell  
By Knight Bros.  
attys.

(No Model.) 14 Sheets—Sheet 12.
T. MUNNELL.
CASH INDICATOR AND REGISTER.
No. 410,603. Patented Sept. 10, 1889.
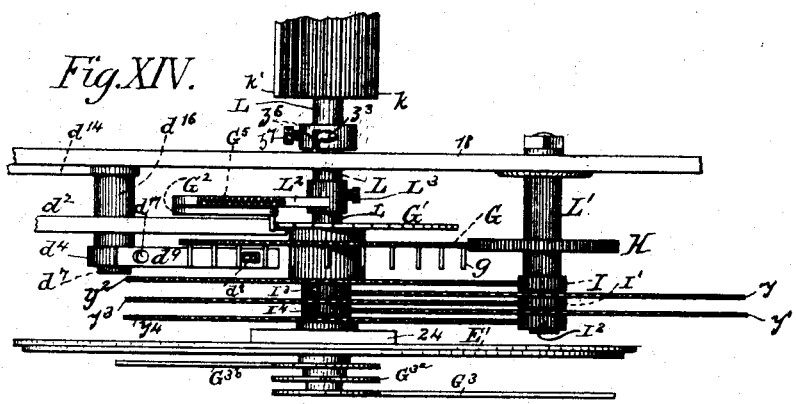
Fig. XIV.
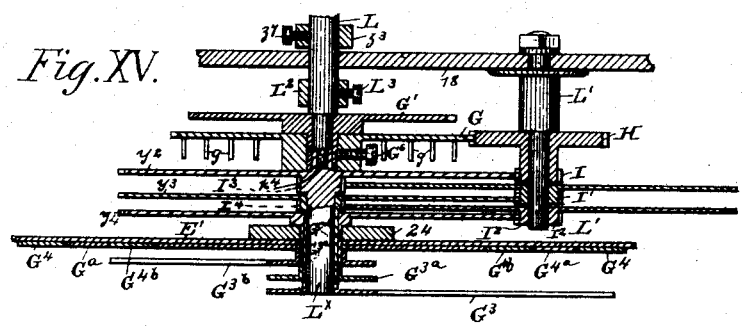
Fig. XV.
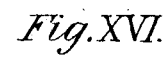
Fig. XVI.
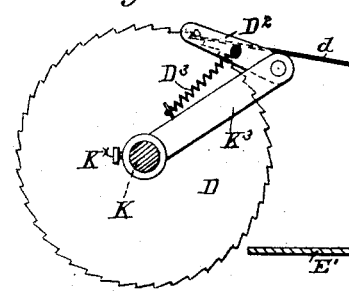
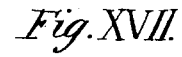
Fig. XVII.
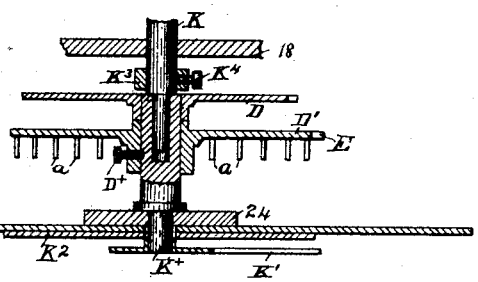
Witnesses:
W. C. Jirdinston.
J. Cadwallader
Inventor
Thomas Munnell
by Jeptha Garrard
his Attorney.

(No Model.) 14 Sheets—Sheet 13.
T. MUNNELL.
CASH INDICATOR AND REGISTER.
No. 410,603. Patented Sept. 10, 1889.
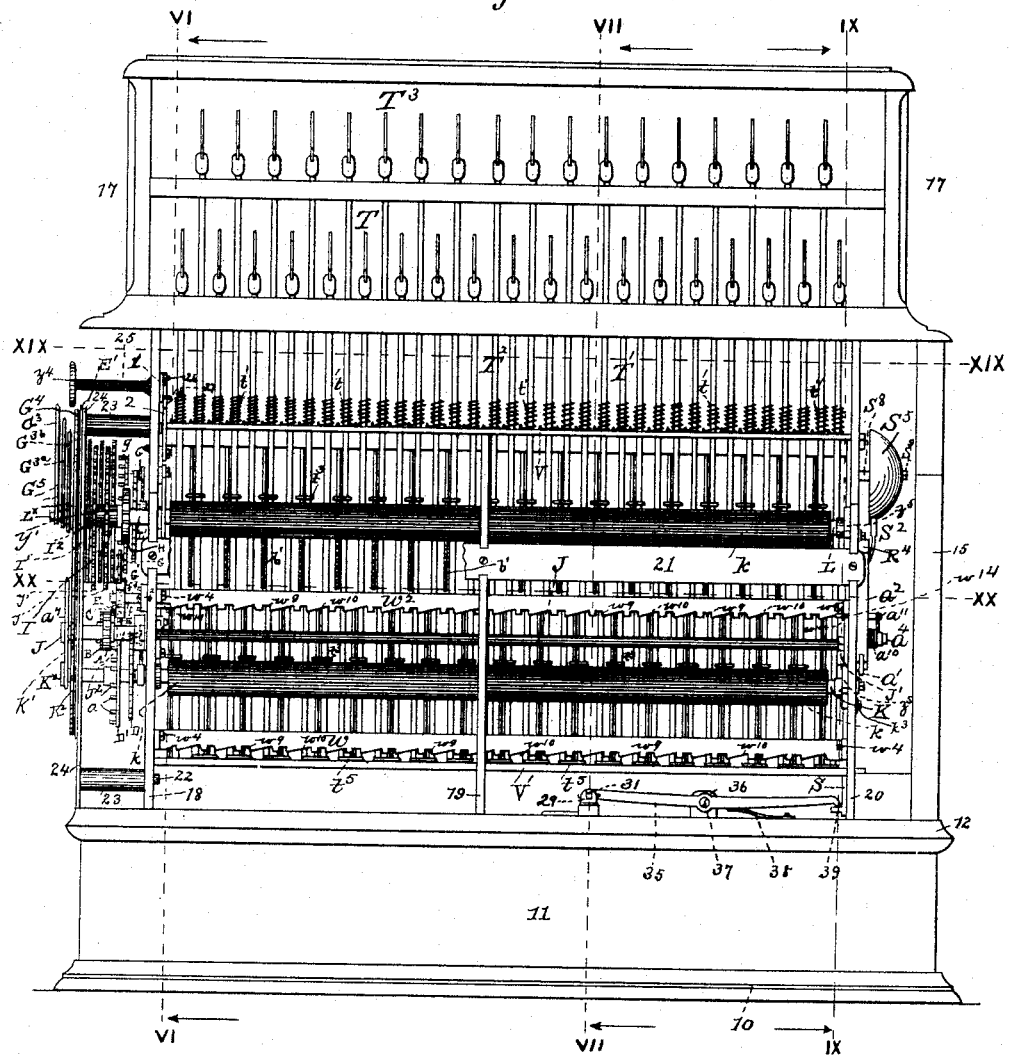
Fig. XVIII.
Witnesses:
W. C. Jirdinston.
Inventor:
Thomas Munnell
by Jeptha Garrard
his Attorney.

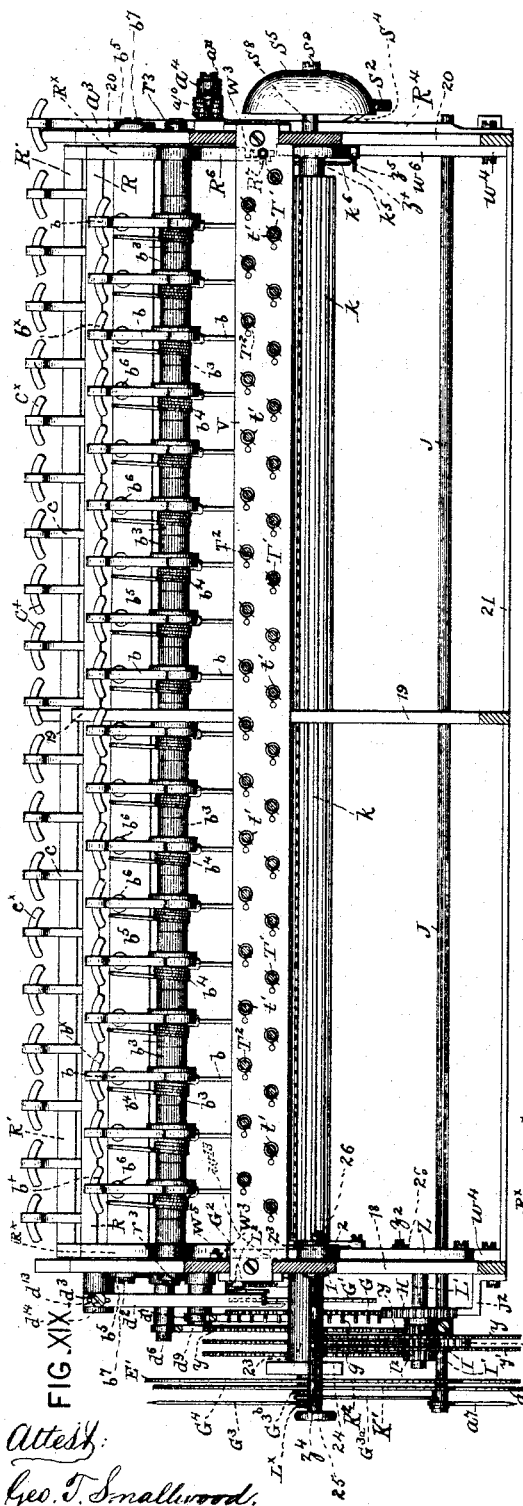

UNITED STATES PATENT OFFICE.

THOMAS MUNNELL, OF MOUNT STERLING, KENTUCKY.

CASH INDICATOR AND REGISTER.

SPECIFICATION forming part of Letters Patent No. 410,603, dated September 10, 1889.

Application filed December 13, 1887. Serial No. 257,737. (No model.)

*To all whom it may concern:*

Be it known that I, THOMAS MUNNELL, a citizen of the United States, residing at Mount Sterling, in the county of Montgomery and State of Kentucky, have invented new and useful Improvements in a Combined Cash Indicator and Register, of which the following is a specification.

My invention relates to a combined cash indicator and register of that type which indicate the amount of money deposited by showing a tablet stamped with said amount, and at the same time register the amount received.

The important features of my invention are, first, a continuous registering mechanism, and, secondly, a registering mechanism in which the cents, when they amount to five cents, are transferred to a five-cent register, and the five cents, when they amount to one hundred cents, are transferred to a dollar-register. The hands or indices on the cent-register, on the five-cent register, and on the dollar-register are never turned back, their operation being continuous.

My invention consists in the improved construction of a combined cash indicator and register hereinafter described, and pointed out in the claims.

In order that my invention may be fully understood, I will proceed to describe it with reference to the accompanying drawings, in which—

Figure I is a front elevation of my improved combined cash indicator and register, the tablets being shown in normal position. Fig. II is an elevation of the dial end thereof, the door being omitted to exhibit the dial-chamber and the handle to the locking device. Fig. III is an elevation of the dial end of the mechanism, the dial being omitted. Fig. IV is a similar view to that shown by Fig. III, the dollar-registering wheels being also omitted. Fig. V is a detail view of a part of a pressure-bar and the front end of a swinging lever, showing their connection. Fig. VI is a vertical transverse section of the register on the line VI VI, Figs. I and XVIII, looking in the direction of the arrows toward the dial end of the mechanism, showing the locking device. Fig. VII is a vertical transverse section of the register on the line VII VII, Figs. I and XVIII, looking in the direction of the arrows toward the dial end of the mechanism. Fig. VIII is an elevation of the alarm end of the mechanism. Fig. IX is a vertical transverse of the register on the line IX IX, Figs. I and XVIII, looking in the direction of the arrows toward the alarm end of the mechanism. Fig. X is a horizontal section of the mechanism on the line X X, Fig. I, looking down and from the front side, the middle portion being omitted. Fig. XI is a horizontal section of the mechanism on the line XI XI, Fig. I, looking down from the front side, the middle portion being omitted. Fig. XII is a front elevation of the mechanism, the middle portion being omitted. Fig. XIII is a rear elevation of the mechanism, the middle portion being omitted. Fig. XIV is a plan view of the dollar-registering mechanism. Fig. XV is a horizontal section thereof. Fig. XVI is a side elevation of a ratchet-wheel and spring-dog. Fig. XVII is a horizontal section of the five-cent-registering mechanism. Fig. XVIII is a rear elevation of the register, parts of the casing and frame being omitted. Fig. XIX is a horizontal section of the mechanism on the line XIX XIX, Fig. XVIII, looking down and from the rear side. Fig. XX is a horizontal section of the mechanism on the line XX XX, Fig. XVIII, looking down and from the rear side.

Similar letters and figures of reference in the several figures of the drawings denote similar parts.

10 is the base of the casing of the register, to which is secured the frame 11, which supports a floor 12, forming within these parts a chamber 13 for a cash-drawer 14.

M is the lid of the drawer, (fully described in Letters Patent No. 354,483, dated December 14, 1886, and issued to me.)

On the floor is secured the body 15 of the casing, having a door 16 at one end for concealing the dials of the register. Above the body is a transparent tower or roof 17, in which are located the lower and upper series of indicating double-faced tablets.

Rigidly secured by any suitable means to the floor of the casing are the vertical supporting frames or plates 18, 19, and 20 for the registering mechanism, having brace-plate 21 at the back of the register. Secured to the upper and lower parts of the end frame 18, on the outside of the latter, by means of screws 22, surrounded by sleeves 23, is a supporting-plate 24.

$a^4$ is a stud secured on the outside of the frame 20, forming a fulcrum for a key-lever $a^3$, which is held in normal position by a spring $a^{10}$, coiled around the stud, having one end secured to a pin $a^{11}$ on the frame and the other end hooked over the key-lever inside of the stud. $a^{12}$ is a stop-pin to limit the movement of this key-lever in one direction, and $a^{13}$ is a pin which limits the movement of the lever in the other direction. The inner arm of this key-lever is provided with a laterally-swinging finger $a^\times$, hinged thereto by a pivot $a^5$ and held in normal position in line with the inner arm of the key-lever by means of a spring $a^6$. The inner end of the finger is formed with an undercut or under-beveled extremity $a^9$.

Mounted in brackets $J'$ $J^2$ on the frames 18 and 20, respectively, is a shaft J, provided at one end outside the frame 20 with a ratchet-wheel $a'$, having five teeth, and at the other end outside the bracket $J^2$ with a cent gear-wheel A and index $a^7$, working in front of a dial $a^8$. The shaft J is rotated intermittently by the key-lever $a^3$, whose finger $a^\times$ engages the teeth of the ratchet-wheel one tooth at a time, and imparts one-fifth of a complete rotation to the ratchet-wheel at each operation, the beveled extremity $a^9$ guiding the finger rearwardly over the following tooth, and the spring $a^6$ causing the finger to assume its normal position under said tooth ready to again operate on the said tooth when the key-lever is depressed. The movement of the ratchet-wheel $a'$ is controlled by a spring $a^2$, secured by a block $a^{14}$ and screw $a^{15}$ to the frame 20, and whose free end is bent so as to fit between two teeth thereof. The bracket $J^2$ is provided at its inner end with a stud $J^3$, on which is mounted and secured by a screw $J^4$ a gear-wheel B, having the same number of teeth as and meshed by the gear-wheel A and furnished with a finger or projection C at the side extending beyond its teeth.

$R^2$ is the lower supporting-rod, and $R^3$ is the upper supporting-rod, respectively, of the lower and upper banks of key-levers $c$ and $b$, passing through the frames 18, 19, and 20, and secured by nuts $r^3$ to the end frames. The lower or five-cent key-levers $c$ are each formed with a rack-segment $c'$ at the inner end, with a cam $c^2$ above the rack-segment, with a sleeve or boxing $c^3$, through which its supporting-rod passes, and with a key $c^\times$, by which it is operated. Each key-lever $c$ is returned to its normal position by a spring $c^4$, coiled around the sleeve or boxing and connected at one end to the stop-plate $c^5$ (which limits the movement of the key-levers $c$) and at the other end is hooked onto the inner part of the key-lever. The stop-plate is secured by screws $c^7$ to the end frames 18 and 20, so as to form a brace-plate at the front of the register.

$c^6$ are set-screws working in the stop-plate for limiting the downward movement of the key-levers $c$.

The upper or dollar key-levers $b$ are each similarly formed to the key-levers $c$, each key-lever $b$ having a rack-segment $b'$, cam $b^2$, sleeve or boxing $b^3$, and key $b^\times$. These key-levers $b$ are limited in their downward movement by a stop-plate $b^5$, also secured as a brace-plate to the end frames 18 and 20 by means of screws $b^7$, and provided with set-screws $b^6$. These key-levers are returned to normal position by springs $b^4$, applied in a similar manner to the springs $c^4$ of the key-levers $c$.

In rear of the banks of key-levers $c$ and $b$, to permit the rack-segments to mesh therewith, are gear-cylinders $k$, having shafts K and L, respectively. These shafts are provided with journal-boxes $k'$, held in place by washers $k^2$, secured by screws $k^3$.

$K^\times$ and $L^\times$ are short shafts journaled at their inner ends $k^4$ on the dial ends of the shafts K and L, respectively, and at their outer ends in the supporting-plate 24. $E'$ is a dial plate supported around these short shafts. These cylinders $k$ are returned to normal position by springs $z^5$, assisted by the springs $c^4$ and $b^4$ of the key-levers $c$ and $b$, and are limited in their rotation by radial arms $z^3$, secured thereto, coming against the stop-pins $z^6$ on the frame 18. The radial arms are secured to their shafts by set-screws $z^7$. The springs $z^5$ are coiled around the collars $k^5$, fixed by pins $k^6$ to the shafts at the bell end of the machine. The springs are secured at their inner ends to the collars and at their outer ends to the pins $z^\times$ by lapping. They are also held in position by the pins $k^6$. The gear-cylinders are each formed with elongated or projecting teeth $k'$, normally in horizontal position to guide the rack-segments into mesh with the proper teeth.

On the short shaft $K^\times$, outside of the frame 18, is mounted a ratchet-wheel D and lantern-wheel $D'$, secured together and to the short shaft $K^\times$, by a set-screw $D^\times$. The lantern-wheel $D'$ has twenty pins $a$ (which are engaged by the finger or projection C) and a peripheral finger E. The short shaft $K^\times$ is also provided with an index $K'$, working in front of the dial $K^2$. The shaft K is provided with a radial arm $K^3$, secured thereto by a set-screw $K^4$ on the inner side of the ratchet-wheel D, having a pivoted dog $D^2$, whose middle portion is connected therewith by means of a spring $D^3$. As the shaft K is rotated the dog $D^2$ engages the teeth of the ratchet-wheel D and advances the latter and the lantern-wheel $D'$ the desired distance. To prevent the backward movement of this ratchet-wheel, I provide a spring $d$, secured by a set-screw $d'$, passing through its slot $d^\times$ and secured to a stud $d^{12}$ on the frame 18, and having its free end engaging the ratchet-tooth in front of the dog.

The lantern-wheel D′ is prevented from making a forward movement greater than that due to the registering of the proper amount by a swinging lever $d^4$, pivoted by a screw $d^6$ to the frame 18 (the screw passing through its sleeve $d^{16}$) and provided with a perforated spring $d^9$, secured by a screw $d^{17}$ to its inner arm, bearing on the pins $a$ of the lantern-wheel and acting as a brake to arrest the movement of the wheel. This swinging lever is formed with a projection or tooth $d^8$, working through the spring, so as to occupy a position between the pins $a$ when it is operated.

On the shaft L outside of the frame 18, above the lantern-wheel D′, is loosely mounted a combined ratchet-wheel G′ and a lantern gear-wheel G, carried by the ratchet-wheel and secured thereto by a set-screw $G^6$, the lantern gear-wheel having twenty pins $g$. The shaft L is provided with a radial arm $L^2$, secured thereto by a set-screw $L^3$, having a pivoted dog $G^2$ connected therewith by a spring $G^5$. As the shaft L is rotated the teeth of the ratchet-wheel G′ are engaged by the dog, which action advances the lantern gear-wheel the desired distance. The ratchet-wheel is prevented from returning by a spring $d^2$, (similar to $d$,) secured to the frame 18 by means of a slot $d^{13}$ and screw $d^3$, connected with a stud $d^{14}$ on the frame 18. The lantern gear-wheel G is also provided with means (similar to the lantern-wheel D′) for preventing the wheel making a forward movement greater than that due, consisting of a swinging lever $d^5$, having a sleeve $d^{16}$, mounted on a screw $d^7$, secured to the frame 18, and having a perforated spring $d^9$ and projection or tooth $d^8$, operating through the spring.

The lantern-wheel D′ operates the lantern gear-wheel G by the following means: A vertically-swinging dog or lever F is pivoted by a stud $f$ on the frame 18 between the lantern-wheels, formed with a hub having two wings or side projections $f'$, on which bears the free end of a spring $f^2$, secured to the frame and tending to hold the dog in normal or upright position. Jointed by a pin $f^3$ to the upper end of the dog is a rearwardly-projecting inverted pawl or hooked arm $f^4$, held in normal position by a spring $f^5$, secured to the dog and bearing upon the heel or butt of the arm. The projection E on the lantern-wheel D′ strikes the lower end of the dog and causes its upper end to pull on the hooked arm, which by this action is caused to engage one of the pins $g$ of the lantern gear-wheel G and advance the latter one pin at a time, or one-twentieth of a complete rotation for each complete rotation of the lantern-wheel D′. Parallel with and in rear of the dial end of the shaft L is a stud L′, rigidly secured to the frame 18. On this stud is loosely mounted a gear-wheel H, meshed by the peripheral gear on the lantern gear-wheel G, having a pinion I, and on the outer side of this gear-wheel H are registering-wheels $y$ $y'$, having pinions I′ and $I^2$, respectively. The gear-wheel H and the registering-wheels $y$ and $y'$ each rotates independently on the stud. On the short shaft $L^x$ (which is journaled on the shaft L at its inner end) is fixed the registering-wheel $y^2$, the pinion $I^3$, and the index $G^3$. Surrounding the short shaft between the pinion $I^3$ and the index $G^3$ is a sleeve $G^{3c}$, to which is fixed the registering-wheel $y^3$, the pinion $I^4$, and the index $G^{3a}$. Around the sleeve $G^{3c}$, between the pinion $I^4$ and the index $G^{3a}$, is a sleeve $G^{3d}$, to which is fixed the registering-wheel $y^4$ and the index $G^{3b}$. The lantern gear-wheel G′ turns the gear-wheel H, whose pinion I turns the registering-wheel $y^2$, whose pinion $I^3$ turns the registering-wheel $y$, whose pinion I′ turns the registering-wheel $y^3$, whose pinion $I^4$ turns the registering-wheel $y'$, whose pinion $I^2$ turns the registering-wheel $y^4$. The springs $d^9$ of the swinging levers $d^4$ and $d^5$ serve the purpose of throwing down the levers from the lantern-wheels, so as to drop the projections or teeth out of the path of the pins when the key-levers $c$ and $b$ return to normal position after being operated. R and R′ are pressure-bars hinged loosely on the lower and upper rods $R^2$ and $R^3$, respectively, of the key-levers $c$ and $b$ by means of cross-arms $R^x$, and are so located beneath their respective key-levers as that the depression of any of the key-levers in either bank will depress one of the bars. The bar R is depressed by the key-levers $c$ and the bar R′ is depressed by the key-levers $b$. The outer ends $d^{10}$ of the swinging levers project just beneath these bars, so as to permit the latter, when depressed, to operate the swinging levers. The outer ends of the swinging levers are each furnished with a set-screw $d^{15}$, to adjust the bearing of the bars. The bars are furnished with springs $d^{11}$, secured by set-screws $d^{18}$, with which they bear on the set-screws. The bars R and R′ are held to normal position by springs $R^5$ and $R^4$, respectively, secured to the frame 20, whose free ends bear on horizontal pins $r$, secured to the inner ends $R^6$ of the cross-arms $R^x$ of the pressure-bars projecting through the slots or openings $r'$ in the frame 20.

$S^5$ is a bell secured to a stud $S^8$ on the end frame 20 of the machine by means of a screw $S^9$. The bell is struck by the following means: S is an upright bar sliding on the inside of the end frame 20 in rear of the opening $S^{10}$ in the frame, and guided in openings in the ends of tablet-supporting plates V V′. The upright bar is provided on its outer side within the opening $S^{10}$ with a swinging pawl S′, hinged to the bar by a screw $S^{11}$ and controlled by a spring $S^6$, secured to the bar. This pawl, when the bar is lifted, engages with and raises the outer end of a lever $S^4$, pivoted by a screw $S^{12}$ to the frame 20 and limited in its movement by a pin $S^{13}$. This lever is provided with a hammer $S^2$, arranged to strike the bell. Each time the outer end of the lever is lifted by the pawl and released by the force of the spiral spring $S^3$, connected to the lever at one end and to the frame at the other end, the upright bar S is raised by the inner ends $R^6$ of the cross-arms $R^×$ of the pressure-bars coming in contact with pins $R^7$ on the vertical or upright bar, and it falls by gravity to its normal position when the pressure-bars are released.

My indicating mechanism for showing a visible tablet for the amount of money deposited at the time the deposit is made is constructed as will now be described. The lower series or five-cent tablets T are fixed transversely of the register, so as to present their edges to the front and back to the tablet-rods T', and the upper series or dollar tablets $T^3$ are fixed in a similar manner to the rods $T^2$, and said rods are supported in crossed position, first, by the lower plate V', and, secondly, by the upper plate V. These rods are turned in these plates freely, and are each furnished with a collar $t$ under the upper plate, and with a spiral spring $t'$, which rests upon the upper plate V to return the rods to normal position, one end of each spring being secured to a rod and the other end of the spring to the upper plate. The rods T' and $T^2$ turn in the lower plate V' freely, and are each furnished with a supporting-collar $t^2$ above the said plate and with a lateral projection or pin $t^3$ extending over their respective cams on the key-levers $b$ and $c$. The tablet-rod T' is also provided with lateral lower or base projection or pin $t^4$ and with lateral upper projection or pin $t^7$, and the tablet-rod $T^2$ is also provided with lateral lower or base projection or pin $t^5$. The lower projections or pins $t^4$ and $t^5$ of the tablet-rods bear against a vertical stop-pin $t^6$ on the lower plate V' when the rods are in normal position, and the upper projection or pin $t^7$ on the rod T' bears against the adjacent rod or bar. The stop-pins thus limit the return movement of the rods.

$w$ is a lower longitudinal bar contiguous to the inner edge of the lower plate V', formed on the lower edge with recesses $w^9$ and inclines $w^{10}$, leading to the recesses, and supported on arms $w^6$, hinged to the inner sides of the frames 18 and 20 by means of screws $w^4$. On the inner side of the bar $w$ the arms $w^6$ are formed, with posts $w^{11}$ resting on the lower plate V' to limit the downward movement of the bar and support it in normal position. The arm $w^6$ of the lower bar $w$ at the dial end of the register has an inward extension $w^{13}$, pivoted or jointed to a vertical pitman $w^3$ by a screw-pin $w'$. The upper end of the pitman is furnished with a pin or projection $w^5$ over the inner end $R^6$ of the cross-arm $R^×$ of the upper pressure-bar $R'$, so that when the pressure-bar is depressed the lower bar $w$ will be lifted by the pitman. The lower bar falls by gravity to assume its normal position.

$w^2$ is an upper longitudinal bar midway between the upper and lower plates V and V', formed on the lower edge with recesses $w^9$ and inclines $w^{10}$, leading to the recesses, similar to those recesses and inclines of the lower bar, and supported on arms $w^6$, hinged to the frames 18 and 20 by means of screws $w^4$, and supported in normal position by pins $w^{14}$ on the frames. The arm $w^6$ of the upper bar $w^2$ at the dial end of the register has a downward extension $w^8$ over the inner end $R^6$ of the cross-arm of the lower pressure-bar, so as to be lifted each time the lower pressure-bar is depressed. This bar $w^2$ also falls to its normal position by gravity.

To render the register inoperative, I provide a locking device N, constructed as follows: 1 is a disk or wheel fixed to the inner end of a shaft 25, journaled in the upper part of the frame 18, and provided with a button $z^4$ at its outer end, by which the shaft is turned from the outside of the frame. This disk or wheel is provided with a wrist-pin 26, on which a bent pitman 2 is suspended, and with an eccentric-pin 27, which forms a stop to limit the movement of the disk or wheel by coming against the inside of the curved portion of the pitman. Hinged to the frame 18 by screw-pins $z$ are upper and lower arms Z Z', coupled by a connecting-rod $z^2$ and screw-pins 28, so as to be moved together, having a screw-pin 3, by which the upper arm Z is jointed to the lower part of the pitman. The disk or wheel 1 being turned a one-half rotation (when the arms, pitman, and wrist-pin are in their raised position) lowers the wrist-pin, pitman, and arms, so as to bring the outer ends of the arms in the way of the radial arms $z^3$ of the shafts K and L, respectively, and prevent the rotation of the latter, and consequently the operation of the key-levers $c$ and $b$.

The drawer is simultaneously opened with each operation of the key-lever by the following means: 29 is a spring-bolt adapted to engage the lid of the drawer, and 30 is a spring for forcing the lid outward when the bolt is withdrawn, so as to gain access to the drawer, which can be accomplished through an opening $m$. To return the lid to close the drawer, it is merely pushed in, when the spring-bolt will engage the lid automatically. The bolt is suspended on the outer end of a rock-bar 31, fulcrumed by a screw-pin 32 to a post 33 and held to normal position by a spring 34. Engaging the inner end of the rock-bar 31 is another intermediate rock-bar 35, fulcrumed to a post 36 by a screw-pin 37 and caused to engage the first rock-bar by a spring 38. The bolt is withdrawn by the vertical bar S each time the latter is lifted. The upright bar S is provided with a projection 39 for this purpose, which engages the inner end of the intermediate rock-bar to operate it, and this rock-bar in turn operates the rock-bar 31.

The cent gear-wheel A registers the cents from one up to five. The lantern-wheel D' registers five cents and the multiples of five from one five to twenty fives. The lantern gear-wheel G registers one dollar to twenty dollars, which amount is transferred to the one-hundred-dollar-register wheel $y^2$. The register-wheel $y^3$ registers one hundred times the amount of the one-hundred-dollar-register wheel, which equals ten thousand dollars. The register-wheel $y^4$ registers one hundred times the amount of the ten-thousand-dollar wheel, which equals one million dollars, when the indices will again be at zero. It will thus be seen that this register will register from one cent to one million dollars, and that the amount of each day's receipts will be easily read off. It will be seen that a single key-lever is provided for registering the cents. The lower key-levers $c$, for registering five cents and the multiples of five, are nineteen in number, so as to register from one-twentieth to nineteen-twentieths of a dollar. For this purpose the teeth on the key-levers $c$, for engaging the tooth-cylinder, range from two teeth, forming one tooth notch or space, on the first lever to twenty teeth, forming nineteen tooth notches or spaces, on the last lever, so as to impart to the lower cylinder and the lantern-wheel D′ from one-twentieth to nineteen-twentieths of a rotation, according to the key-lever operated, the gear-cylinder having twenty teeth, including the elongated guide-tooth $k'$. The upper key-levers $b$, for registering dollars from one dollar to eighteen dollars, are eighteen in number and have a corresponding number of tooth notches or spaces for imparting to the upper gear-cylinder (which also has twenty teeth, including the elongated tooth) and lantern gear-wheel G from one-twentieth to eighteen-twentieths of a rotation, according to the key-lever operated. Each key-lever has located over its key the number indicating the amount which each key-lever will cause to be registered and indicated. The tablets of the five-cent and dollar key-levers are correspondingly numbered on both sides, so that when these key-levers are operated to turn the tablets the purchaser and salesman can both observe whether the proper key-lever was depressed so as to register the correct amount paid and received.

The operation of this register is as follows: All the indices being placed at zero and the registering devices in normal starting position, if it is desired to register the receipt of cents from one to four cents the key-lever $a^3$ is operated from one to four times. At each operation of this key-lever the finger $a^\times$ will strike upwardly on a tooth of the ratchet-wheel $a'$, which is controlled by the spring $a^2$, imparting one-fifth of a rotation to the latter and to the shaft J and gear-wheels A and B. For each complete rotation of these parts caused by five operations of the key-lever $a^3$ the index $a^7$ will be carried from zero to zero over the cent-dial, registering the receipt of five cents, and the finger or projection C on the gear-wheel B will strike a pin $a$ on the lantern-wheel D′ and impart one-twentieth of a complete rotation to the latter, and at the same time the index K′ will register the receipt of five cents by moving one point over the twenty-five-cent dial. On the release of the key-lever $a^3$ the bevel $a^9$ on the finger $a^\times$ slides down the next tooth to be advanced of the ratchet-wheel $a'$. The finger, swinging outward on its pivot $a^5$, will then be compelled by the spring $a^6$ to assume its normal position under said tooth. At each operation of the lower or five-cent key-lever $c$ the cam $c'$ comes against the projection or pin $t^3$ on the tablet-rod T′ and imparts a one-quarter of a rotation to the latter to turn the tablet and exhibit its face to the back and front of the register. The longitudinal bar $w$ yields upwardly to permit the pin or projection $t^7$ on the same tablet-rod to travel along an incline $w^{10}$, and then the bar drops over the pin or projection $t^7$, when the latter passes into its recess $w^9$. At the same time the uppermost tooth of the rack-segment $c^2$ comes against the elongated tooth $k'$ of the lower gear-cylinder $k$ on the shaft K, said tooth guiding the rack-segment into mesh with the proper gear-teeth of the gear-cylinder, so as to impart sufficient rotation to the latter to impel the registering mechanism connected therewith forward a sufficient distance to register the amount designated by the key-lever operated. The rotation of the lower gear-cylinder causes the spring-pawl $D^2$ to engage the teeth of the ratchet-wheel D and advance it with the lantern-wheel D′ the number of teeth corresponding to the number of five cents to be registered by the index K′ on the dial $K^2$. The ratchet-wheel D is turned from one to nineteen teeth at each operation, so that the index will register the receipt of from one to nineteen five cents. In registering twenty five cents the index passes from zero to zero, equal to a complete rotation of the lantern-wheel D′. Upon each complete rotation of the latter the peripheral finger or projection E on the lantern-wheel D′ comes in contact with the lever F and causes the inverted pawl or hooked arm $f^4$ to engage a pin $g$ of the lantern gear-wheel G and impart a one-twentieth of a rotation to the latter, the gear-wheel H and the registering-wheels between the lantern gear-wheel G and index $G^3$ causing the latter to register one point, representing the receipt of a dollar in five cents on the dial $G^4$. The continued downward movement of the key-lever $c$ brings it in contact with the pressure-bar R, which causes the inner end $R^6$ of its cross-arm $R^\times$ on the dial end of the register to lift the upper bar $w^2$ by coming against the downturned extension $w^8$ of its arm $w^6$, and thus release any pin or projection $t^7$ which may be retaining a tablet-rod T′ to its advanced position, the key-lever still holding onto the pin or projection $t^3$ of its rod until the pressure-bar drops the bar $w^2$ to engage the projection or pin $t^7$ of the rod last operated, when the key-lever is released. The tablet-rod T' is returned by its spring $t'$ and arrested in its return movement by the pin or projection $t^4$ coming against the stop-pin $t^6$. The inner end of the cross-arm of the pressure-bar on the bell end of the register at the same time that it is operated by the lever comes in contact with the upper pin $R^7$ on the upright bar S, and lifts the latter to operate the bell mechanism and the lid-releasing devices. The elevation of the bar S brings the swinging pawl S' in contact with the hammer-lever and causes the hammer to strike the bell. The projection 39 operates the rock-bars and releases the drawer by withdrawing the spring-bolt. When the key-lever $c$ is at the limit of its downward movement, the pressure-bar bears on the outer end $d^{10}$ of the swinging lever $d^4$ and causes the arrest of the lantern-wheel D'. On the release of the key-lever $c$ the gear-cylinder is returned to normal position by its spring $z^5$ and is arrested in its return by the radial arm $z^3$ coming against the stop-pin $z^6$, the pressure-bar is elevated by its spring, and the bars $w^2$ and S fall to normal position by gravity, ready for the next operation of a key-lever $c$. In registering dollars an upper or dollar key-lever $b$ is depressed, which action causes its rack-segment to mesh with the upper gear-cylinder on the shaft L and rotate the gear-cylinder a sufficient distance to advance the ratchet-wheel G' and lantern gear-wheel G a corresponding number of teeth to the number of the key-lever, and to register the amount by means of the index $G^3$ on the dial $G^4$. A complete rotation of the ratchet-wheel G' and lantern gear-wheel G will register twenty dollars on the one-hundred-dollar dial $G^4$ by means of the gear-wheel H, pinion I, and registering-wheel $y^2$. Five complete rotations of the lantern gear-wheel G and a complete rotation of the registering-wheel $y^2$ will turn the one-hundred-dollar index $G^{3a}$ from zero to zero and cause one point to be registered by the index $G^{3a}$ on the ten-thousand-dollar dial $G^{4a}$ by means of the pinion $I^3$, registering-wheel $y$, pinion $I^4$, and registering-wheel $y^3$. A complete rotation of the registering-wheel $y^3$ will turn the ten-thousand-dollar index $G^{3a}$ from zero to zero, register the receipt of ten thousand dollars, and cause one point to be registered by the index $G^{3b}$ on the million-dollar dial $G^4$ by means of the pinion $I^4$, registering-wheel $y'$, pinion $I^2$, and registering-wheel $y^4$. A complete rotation of the registering-wheel $y^4$ from zero to zero will register the receipt of a million dollars. This being accomplished, all the parts will have assumed their original position. The operation of the upper or dollar key-lever $b$ causes the depression of the pressure-bar R', (which bears on the swinging lever $d^5$,) the inner end $R^6$ of the cross-arm $R^\times$ of which on the dial end of the register, coming in contact with the pin or projection $w^5$, lifts the lower bar $w$ by means of its pitman $w^3$, and permits the return of an advanced tablet-rod $T^2$ by releasing its pin or projection $t^5$, which latter, coming against the stop-pin $t^6$, arrests the rearward movement of the tablet-rod, caused by its spring $t'$. The inner end $R^6$ of the cross-arm $R^\times$ of the upper pressure-bar at the alarm end of the register comes upwardly against the upper pin or projection $R^7$ on the upright bar S and lifts the latter, so as to operate the bell device and lid-connections. The cam $b^2$ of the key-lever $b$, coming in contact with the projection $t^3$ of the dollar tablet-rod $T^2$, turns the latter a one-quarter of a rotation to exhibit the faces of its tablet $T^3$ to the back and front. The projection or pin $t^5$ slips on an incline $w^{10}$ into a recess $w^9$ of the lower bar $w$, and the tablet-rod $T^2$ is retained until the operation of the next key-lever causes the upper pressure-bar to release it from the lower bar. The release of the key-lever $b$ permits the upper gear-cylinder to return.

Having thus described my invention, the following is what I claim as new therein and desire to secure by Letters Patent:

1. The combination of the cent key-lever $a^3$, having a finger swinging in a plane transverse of the plane of said lever, and a fulcrum $a^4$, the stop-pins $a^{12}$ and $a^{13}$, the shaft J, having a ratchet-wheel $a'$ and an index $a^7$, and the dial $a^8$, substantially as described.

2. The combination of the cent key-lever $a^3$, having a finger swinging in a plane transverse of the plane of said lever, and a fulcrum $a^4$, the shaft J, having a ratchet-wheel $a'$, and the spring $a^2$, having its free end fitting in the space between two teeth of the ratchet-wheel, substantially as described.

3. The combination of the key-lever $a^3$, having a hinged spring-finger $a^\times$, and the shaft J, having a ratchet-wheel $a'$ and an index $a^7$, substantially as described.

4. The combination of the key-lever $a^3$, having a hinged spring-finger $a^\times$, the shaft J, having a ratchet-wheel $a'$ and an index $a^7$, and the spring $a^2$, having its free end fitting between two teeth of the ratchet-wheel for controlling the movement of the latter, substantially as described.

5. The key-lever $a^3$, comprising the finger $a^\times$, formed with an under-cut or bevel $a^9$, the pivot $a^5$, by which the finger is hinged to the key-lever, and the spring $a^6$, substantially as described.

6. The combination of the key-lever $a^3$, having a hinged spring-finger $a^\times$, formed with a bevel $a^9$, and the shaft J, having a ratchet-wheel $a'$ and an index $a^7$, substantially as described.

7. The combination of the key-lever $a^3$, having a hinged spring-finger $a^\times$, formed with a bevel $a^9$, the shaft J, having a ratchet-wheel $a'$ and an index $a^7$, and a spring $a^2$, having its free end fitting between two teeth of the ratchet-wheel for controlling the movement of the latter, substantially as described.

8. The combination of the key-lever $a^3$, having a finger and a fulcrum $a^4$, the shaft J, having a ratchet-wheel $a'$, and gear-wheel A, the gear-wheel B, meshed by the gear-wheel A, having a finger or projection C, the lantern-wheel D', having pins $a$, with which the finger or projection engages, and the short shaft $K^\times$, having an index K', substantially as described.

9. The combination of the rod $R^2$, the key-lever $c$, and boxing $c^3$, the stop-plate $c^5$, and spring $c^4$, having one end hooked over the key-lever on the inner side of its shaft and the other end secured to the stop-plate, substantially as described.

10. The combination of the gear-cylinder $k$, having elongated guide-tooth $k'$, and the key-lever $c$, having rack-segment $c'$, substantially as described.

11. The combination of the gear-cylinder $k$, having a shaft K, provided with a radial arm $z^3$, the stop-pin $z^6$, the returning-spring $z^5$, and a key-lever $c$, having a rack-segment $c'$, substantially as described.

12. The combination of a key-lever having a rack-segment, a gear-cylinder having a shaft, a short shaft having a ratchet-wheel and an index, and the shaft and pivoted spring-dog connection between the cylinder-shaft and the ratchet-wheel, substantially as described.

13. The combination of the key-lever $c$, having rack-segment $c'$, the gear-cylinder $k$, the shaft K, having a radial arm $K^3$, provided with a pivoted dog $D^2$, the spring connecting the pivoted dog to the arm, the ratchet-wheel D, with which the dog engages, the lantern-wheel D', turning with the ratchet-wheel, and a short shaft $K^\times$, having an index K', substantially as described.

14. The combination of the shaft K, provided with a radial arm, a short shaft having a ratchet-wheel and an index, the pivoted spring-dog connection between the arm and ratchet-wheel, and a spring $d$, engaging a ratchet-tooth, substantially as described.

15. The combination of the shaft K, having a radial arm $K^3$, provided with a pivoted dog $D^2$, the spring connecting the pivoted dog to the arm, the ratchet-wheel D, with which the dog engages, the lantern-wheel D', turning with the ratchet-wheel, the short shaft $K^\times$, having an index K', and a spring $d$, engaging the ratchet-teeth in front of the dog, substantially as described.

16. The combination of the lantern-wheel D', having pins $a$, and the swinging lever $d^4$, having perforated spring $d^9$, and tooth or projection $d^8$, working through the spring, substantially as described.

17. The combination of the key-lever $c$, pressure-bar R, lantern-wheel D', having pins $a$, and the swinging lever $d^4$, having outer end $d^{10}$, projecting beneath the pressure-bar and provided with perforated spring $d^9$, and stud or projection $d^8$, working through the spring, substantially as described.

18. The combination of the lower lantern-wheel D', having peripheral finger E, the upper lantern-wheel G, and the vertically-swinging dog or lever F, having an inverted pawl $f^4$, for engaging the pins of the upper lantern-wheel, substantially as described.

19. The combination of the lower lantern-wheel D', the upper lantern-wheel G, and the connection between the lantern-wheels, comprising a swinging dog or lever F, formed with a hub having two wings $f$, a spring bearing on the projections, inverted pawl $f^4$, jointed to the dog or lever, and a spring bearing on the heel or butt of the spring, substantially as described.

20. The combination of a key-lever, a supporting-rod, pressure-bar beneath the lever having cross-arms R, and horizontal pin on the inner end $R^6$ of a cross-arm, a spring bearing on the pin to retain the pressure-bar in normal position, the upright bar S, and pin $R^7$, substantially as described.

21. The combination of the longitudinally-moving bar S, the swinging pawl S' thereon, having spring $S^6$, the hammer-lever $S^4$, the hammer $S^2$, lifting device for the bar, and alarm $S^5$, substantially as described.

22. The combination of the upright bar S, the pawl S', the pin $S^{11}$, by which the pawl is pivoted to the bar, the pawl-spring $S^6$, the hammer-lever $S^4$, pin $S^{12}$, by which the lever is pivoted, the hammer $S^2$, the bell $S^5$, and the hammer-spring $S^3$, substantially as described.

23. The combination of the upright bar S, having a projection 39, the rock-bars 35 and 34, the spring-bolt 29, and drawer-lid M, substantially as described.

24. The combination of a key-lever pressure-bar having cross-arms $R^\times$, the upright bar S, having pin $R^7$, and the bell-operating devices, substantially as described.

25. The combination of a key-lever, supporting-rod, pressure-bar beneath the lever having cross-arms $R^\times$, and horizontal pin on the inner end of a cross-arm, a spring bearing on the pin to retain the pressure-bar in normal position, the upright bar S, a pin $R^7$, and a projection 39, substantially as described.

26. The combination of a key-lever, pressure-bar having cross-arms $R^\times$, the upright bar S, having the projection 39, the pin $R^7$, and the lid-releasing devices, substantially as described.

27. The combination of a shaft, device for turning the shaft, combined ratchet and gear wheel mounted loosely on the shaft, connection between said shaft and said ratchet-wheel by which the latter is rotated on each movement of the shaft, the stud L', the gear-wheel H, mounted on the stud, having pinion I, and the short shaft having registering-wheel $y^2$ and the index $G^3$, substantially as described.

28. The combination of a key-lever having a rack-segment, a gear-cylinder having a shaft, combined ratchet and gear wheel mounted loosely on the shaft, radial arm and spring-dog connection between said shaft and said ratchet-wheel by which the latter is rotated on each movement of the shaft, the stud L', the gear-wheel H, mounted on the stud, having pinion I, and the short shaft L$^\times$, having registering-wheel $y^2$ and the index G$^3$, substantially as described.

29. The combination of a shaft, device for turning the shaft, combined ratchet and gear-wheel mounted loosely on the shaft, connection between said shaft and said ratchet-wheel by which the latter is rotated on each movement of the shaft, the stud L′, the gear-wheel H, mounted on the stud, having pinion I, the short shaft L$^\times$, having registering-wheel $y^2$ and pinion I$^3$, the registering-wheel $y$, mounted on the stud, having pinion I′, and the sleeve G$^{3c}$, mounted on the short shaft, having registering-wheel $y^3$ and index G$^{3a}$, substantially as described.

30. The combination of a key-lever having a rack-segment, a gear-cylinder having a shaft, combined ratchet and gear wheel mounted loosely on the shaft, radial arm and spring-dog connection between said shaft and said ratchet-wheel by which the latter is rotated on each movement of the shaft, the stud L′, the gear-wheel H, mounted on the stud, having pinion I, the short shaft L$^\times$, having registering-wheel $y^2$ and pinion I$^3$, the registering-wheel $y$, mounted on the stud having pinion I′, and the sleeve G$^{3c}$, mounted on the short shaft, having registering-wheel $y^3$ and index G$^{3a}$, substantially as described.

31. The combination of a shaft, device for turning the shaft, combined ratchet-wheel and gear-wheel mounted loosely on the shaft, connection between said shaft and said ratchet-wheel by which the latter is rotated on each movement of the shaft, the stud L′, the gear-wheel H, mounted on the stud, having pinion I, the short shaft L$^\times$, having registering-wheel $y^2$ and pinion I$^3$, the registering-wheel $y$, mounted on the stud, having pinion I′, the sleeve G$^{3c}$, mounted on the short shaft, having registering-wheel $y^3$ and pinion I$^4$, the registering-wheel $y′$, mounted on the stud, having pinion I$^2$, and the sleeve G$^{3d}$, mounted on the sleeve G$^{3c}$, having registering-wheel $y^4$ and index G$^{3b}$, substantially as described.

32. The combination of a key-lever having a rack-segment, a gear-cylinder having a shaft, combined ratchet and gear wheel mounted loosely on the shaft, radial arm and spring-dog connection between said shaft and said ratchet-wheel by which the latter is rotated on each movement of the shaft, the stud L′, the gear-wheel H, mounted on the stud, having pinion I, the short shaft L$^\times$, having registering-wheel $y^2$ and pinion I$^3$, the registering-wheel $y$, mounted on the stud, having pinion I′, the sleeve G$^{3c}$, mounted on the short shaft, having registering-wheel $y^3$ and pinion I$^4$, the registering-wheel $y′$, mounted on the stud, having pinion I$^2$, and the sleeve G$^{3d}$, mounted on the sleeve G$^{3c}$, having registering-wheel $y^4$ and index G$^{3b}$, substantially as described.

33. The combination of the five-cent shaft K, device for turning the five-cent shaft, the short shaft K$^\times$, the ratchet-wheel D, and the wheel D′, having peripheral finger E, carried by the short shaft, connection between said five-cent shaft and said ratchet-wheel by which the latter is impelled forward, the dollar-shaft L, device for turning the dollar-shaft, the short shaft L$^\times$, combined ratchet-wheel G′ and lantern gear-wheel G, having pins $g$, mounted on said dollar-shaft, connection between said dollar shaft and the last-named ratchet-wheel by which the latter is impelled forward, connection between the peripheral finger and the pins, the stud L′, the gear-wheel H, mounted on the stud, having pinion I, and the short shaft L$^\times$, having registering-wheel $y^2$ and the index G$^3$, substantially as described.

34. The combination of a cent-shaft J, having an index, five-cent shaft K, short shaft K$^\times$ having an index, dollar-shaft L, short shaft L$^\times$, having an index, levers by which the main shafts are impelled in one direction only to produce continuous registration, connections, substantially as shown, between the cent-shaft and the short shaft K$^\times$, connection, substantially as shown, between the five-cent shaft and dollar-shaft, and connection, substantially as shown, between the dollar-shaft L and the short shaft L$^\times$.

35. The combination of a key-lever having a cam, and a tablet-rod having a tablet normally transverse of the register and provided with a projection on which the cam operates to impart a one-quarter of a rotation to the rod to exhibit the faces of the tablet longitudinally of the register, substantially as described.

36. The combination of a key-lever having a cam, a stop-pin, a tablet-rod having a projection with which the cam engages for rotating the rod, and also a projection bearing against the stop-pin, and a spring for returning the rod when the latter is released, substantially as described.

37. The combination of a pivoted bar having recesses and inclines leading thereto on its edge, a key-lever having a cam, and a tablet-rod having a projection with which the cam engages for rotating the rod, and also a projection with which the pivoted bar engages for retaining the rod when the latter is advanced, substantially as described.

38. The combination of a pivoted bar having recesses and inclines leading thereto on its edge, a key-lever having a cam, a stop-pin, and a tablet-rod having a projection with which the cam engages, and also a projection with which the pivoted bar engages, the bar projection adapted to bear against the stop-pin when in normal position, substantially as described.

39. The combination of a pivoted bar having recesses and inclines leading thereto on its edge, a key-lever having a cam, a stop-pin, and a tablet-rod having three projections—to wit, a projection on which the cam operates, a projection with which the bar engages, and a projection arrested by the stop-pin—substantially as described.

40. The combination of a pivoted bar having recesses and inclines leading thereto on its edge, a key-lever, a tablet-rod rotated by the key-lever and retained by the pivoted bar, and means by which the latter is operated to release the tablet-rod, substantially as described.

41. The combination of the lower bar $w$, having recesses and inclines leading thereto on its edge, arms $w^6$, by which the bar is pivoted, inward extension $w^{13}$ to one of the arms, the upper pressure-bar R′, having cross-arms R$^\times$, the pitman $w^3$, upper key-lever, and a tablet-rod rotated by the key-lever, retained by the pivoted bar, and released by the pressure-bar, substantially as described.

42. The combination of the upper bar $w^2$, having recesses and inclines leading thereto on its edge, arms $w^6$, by which the bar is pivoted, inward and downward extension $w^8$ to one of the arms, the lower pressure-bar having cross-arms R$^\times$, lower key-lever, and a tablet-rod rotated by the key-lever, retained by the pivoted bar, and released by the pressure-bar, substantially as described.

43. The combination of a tablet-rod having a pin or projection, a key-lever engaging the pin or projection by which the rod is rotated, a pivoted notched bar by which the rod is retained, and a pressure-bar by which the bar is lifted and the rod is released, substantially as described.

44. The combination of the upper plate V, lower plate V′, tablet-rods T′ T$^2$, turning freely in the plates, lower tablet T, upper tablet T$^3$, lower key-lever operating the lower tablet-rod, the upper key-lever operating the upper tablet-rod, pivoted lower bar for retaining the upper tablet-rod, pivoted upper bar for retaining the lower tablet-rod, lower pressure-bar for releasing the upper tablet-rod, and upper pressure-bar for releasing the lower tablet-rod, substantially as described.

45. The combination of the pivoted bars $w$ and $w^2$, key-levers $c$ and $b$, and the tablet-rods T′ and T$^2$, having projections engaged by the key-levers and pivoted bars, substantially as described.

46. The combination of the key-levers $c$ and $b$, the pressure-bars R and R′, having cross-arms, the upright bar S, having horizontal pins engaged by the pressure-bars, and the alarm mechanism connected with the upright bar, substantially as described.

47. The combination of the shaft K, having radial arm $z^3$, the shaft L, having radial arm $z^3$, the pivoted arms Z′ and Z, the connecting-rod $z^2$, and mechanism for moving the pivoted arms to release the radial arms, substantially as described.

48. The combination of a shaft having a radial arm $z^3$, the hinged arm, the pitman 2, and disk or wheel 1, having eccentric wrist-pin 26, to which the pitman is connected, substantially as described.

49. The combination of a shaft having a radial arm $z^3$, the hinged arm, the curved pitman 2, and the disk having eccentric wrist-pin 26, to which the pitman is connected, and the eccentric stop-pin 27, substantially as described.

50. The combination of a shaft L, having a radial arm $z^3$, hinged arm Z, pitman 2, and operating-shaft 25, disk or wheel 1 on the inner end of the operating-shaft, having eccentric wrist-pin 26, and button $z^4$ on the outer end of the operating-shaft, substantially as described.

The foregoing specification of my invention signed by me this 30th day of August, A. D. 1887.

THOMAS MUNNELL.

Witnesses:
P. J. CADWALLADER,
WM. JONES.